US012206193B2

(12) United States Patent
Liao

(10) Patent No.: US 12,206,193 B2
(45) Date of Patent: Jan. 21, 2025

(54) ELECTRICAL POWER CONNECTOR AND ELECTRICALLY CONDUCTIVE TERMINAL

(71) Applicant: BELLWETHER ELECTRONIC CORP., Taoyuan (TW)

(72) Inventor: Yen-Jang Liao, Taoyuan (TW)

(73) Assignee: BELLWETHER ELECTRONIC CORP., Taoyuan (TW)

( * ) Notice: Subject to any disclaimer, the term of this patent is extended or adjusted under 35 U.S.C. 154(b) by 347 days.

(21) Appl. No.: 17/832,695

(22) Filed: Jun. 6, 2022

(65) Prior Publication Data

US 2023/0006387 A1 Jan. 5, 2023

(30) Foreign Application Priority Data

Jul. 5, 2021 (TW) ................................ 110124538

(51) Int. Cl.
*H01R 13/10* (2006.01)
*H01R 4/48* (2006.01)
*H01R 13/18* (2006.01)

(52) U.S. Cl.
CPC ............... *H01R 13/10* (2013.01); *H01R 4/48* (2013.01); *H01R 13/18* (2013.01)

(58) Field of Classification Search
CPC ...... H01R 13/03; H01R 4/185; H01R 12/712; H01R 13/6272; H01R 13/432; H01R 13/40; H01R 13/502; H01R 13/10; H01R 4/48; H01R 13/18
See application file for complete search history.

(56) References Cited

U.S. PATENT DOCUMENTS

2010/0003856 A1* 1/2010 Fu ........................ H01R 12/721 439/637
2015/0064978 A1* 3/2015 Chen .................. H01R 43/0263 439/656

FOREIGN PATENT DOCUMENTS

| | | | |
|---|---|---|---|
| CN | 1479416 A | 3/2004 | |
| CN | 102136647 A * | 7/2011 | |
| CN | 108493733 A * | 9/2018 | ............. H01R 13/02 |
| TW | M477056 U | 4/2014 | |
| TW | M554646 U | 1/2018 | |

* cited by examiner

*Primary Examiner* — Jean F Duverne
(74) *Attorney, Agent, or Firm* — Li & Cai Intellectual Property Office

(57) ABSTRACT

An electrical power connector and an electrically conductive terminal are provided. The electrical power connector includes an insulating housing, multiple electrically conductive terminals, and at least one position fixing member. The insulating housing includes multiple column bodies and a convex rib structure, the column bodies extend in a first direction and are arranged at intervals, and the convex rib structure extends in a second direction and is formed in an intersecting arrangement. An inside of the insulating housing has multiple tunnels that correspondingly penetrate through the column bodies in the first direction. Multiple grid passages are formed by the convex rib structure. The electrically conductive terminals are respectively mated in the grid passages and the tunnels. The electrically conductive terminals are each connected to a cable. The at least one position fixing member is embedded on at least one side of the convex rib structure.

22 Claims, 12 Drawing Sheets

ELECTRICAL POWER CONNECTOR AND ELECTRICALLY CONDUCTIVE TERMINAL

CROSS-REFERENCE TO RELATED PATENT APPLICATION

This application claims the benefit of priority to Taiwan Patent Application No. 110124538, filed on Jul. 5, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electrical power connector and an electrically conductive terminal, and more particularly to an electrically conductive terminal and an electrical power connector having a terminal position assurance device.

BACKGROUND OF THE DISCLOSURE

Conventionally, a terminal structure inside an electrical power connector is externally connected to a cable. During a process in which male and female terminals of the electrical power connector are repeatedly plugged and pulled, a connection between the terminal structure inside the electrical power connector and the cable can easily loosen, thereby resulting in a poor electrical connection and further causing the electrical power connector to fail.

Therefore, how to overcome the above-mentioned issues through an improvement in structural design has become one of the important issues to be solved in the related art.

SUMMARY OF THE DISCLOSURE

In response to the above-referenced technical inadequacy, the present disclosure provides an electrical power connector and an electrically conductive terminal.

In one aspect, the present disclosure provides an electrical power connector that includes an insulating housing, a plurality of electrically conductive terminals, and at least one position fixing member. The insulating housing includes a plurality of column bodies and a convex rib structure. The plurality of column bodies extend in a first direction and are arranged at intervals, the convex rib structure is configured to extend in a second direction and is formed in an intersecting arrangement, and the first direction is opposite to or perpendicular to the second direction. An inside of the insulating housing has a plurality of tunnels, each of the tunnels correspondingly penetrates through one of the plurality of column bodies in the first direction, and one of a plurality of first terminal openings and one of a plurality of second terminal openings that corresponds to the one of the plurality of first terminal openings are formed at two terminals of the one of the plurality of column bodies, respectively. The convex rib structure is arranged at peripheries of the second terminal openings to form a plurality of grid passages, and the plurality of grid passages correspond to the plurality of tunnels, respectively. The plurality of electrically conductive terminals are respectively mated in the plurality of grid passages and the plurality of tunnels, and each of the electrically conductive terminals has a cable clamping section and a mating section. The cable clamping section is used to clamp one of a plurality of cables, and the mating section is formed by one side of the cable clamping section extending in a third direction. An opening is formed at one side of the mating section, and the one side of the mating section is opposite to another side of the mating section that is connected to the cable clamping section. The mating section includes a first side wall and a second side wall that are opposite to each other, and a third side wall and a fourth side wall that are opposite to each other and connected between the first side wall and the second side wall. A first gap is formed in the first side wall in the third direction, a first notch is formed at a position between the first gap in the first side wall and the opening, and a width of the first notch is greater than a width of the first gap. The at least one position fixing member is embedded on at least one side of the convex rib structure so as to be fixed on the insulating housing, and the at least one position fixing member fixes the plurality of electrically conductive terminals and the plurality of cables in position.

In another aspect, the present disclosure provides an electrical power connector that includes an insulating housing and a plurality of electrically conductive terminals. The insulating housing includes a main body and a plurality of column bodies. The main body has a first side surface and a second side surface that are opposite to each other, and one end of each of the plurality of column bodies is arranged on the first side surface. The plurality of column bodies extend in a first direction and are arranged at intervals. An inside of the insulating housing has a plurality of tunnels, and each of the tunnels correspondingly penetrates through one of the plurality of column bodies and the main body in the first direction. Each of the tunnels has one of a plurality of first terminal openings formed at another end of one of the plurality of column bodies, and has one of a plurality of third terminal openings that corresponds to the one of the plurality of first terminal openings formed at the second side surface. The plurality of electrically conductive terminals are respectively mated in the plurality of tunnels, and each of the electrically conductive terminals has a cable clamping section and a mating section. The cable clamping section is used to clamp a cable, and the mating section is formed by one side of the cable clamping section extending in the first direction. An opening is formed at one side of the mating section, and the one side of the mating section is opposite to another side of the mating section that is connected to the cable clamping section. The mating section includes a first side wall and a second side wall that are opposite to each other, and a third side wall and a fourth side wall that are opposite to each other and connected between the first side wall and the second side wall. A first gap is formed in the first side wall in the first direction, a first notch is formed at a position between the first gap in the first side wall and the opening, and a width of the first notch is greater than a width of the first gap.

In yet another aspect, the present disclosure provides an electrically conductive terminal that includes a cable clamping section and a mating section. The mating section is formed by one side of the cable clamping section extending in a first direction. An opening is formed at one side of the mating section, and the one side of the mating section is opposite to another side of the mating section that is connected to the cable clamping section. The mating section includes a first side wall and a second side wall that are opposite to each other, and a third side wall and a fourth side wall that are opposite to each other and connected between the first side wall and the second side wall. A first gap is formed in the first side wall in the first direction, a first notch is formed at a position between the first gap in the first side wall and the opening, and a width of the first notch is greater than a width of the first gap.

Therefore, by virtue of "the two position fixing members being fixed on the insulating housing by being embedded on at least one side of the convex rib structure, such that the two position fixing members fix the plurality of electrically conductive terminals and the plurality of cables in position" and "a width of the first notch being greater than a width of the first gap", the electrical power connector and the electrically conductive terminal provided by the present disclosure can maintain a stable connection between the electrically conductive terminal and the cable in the electrical power connector.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
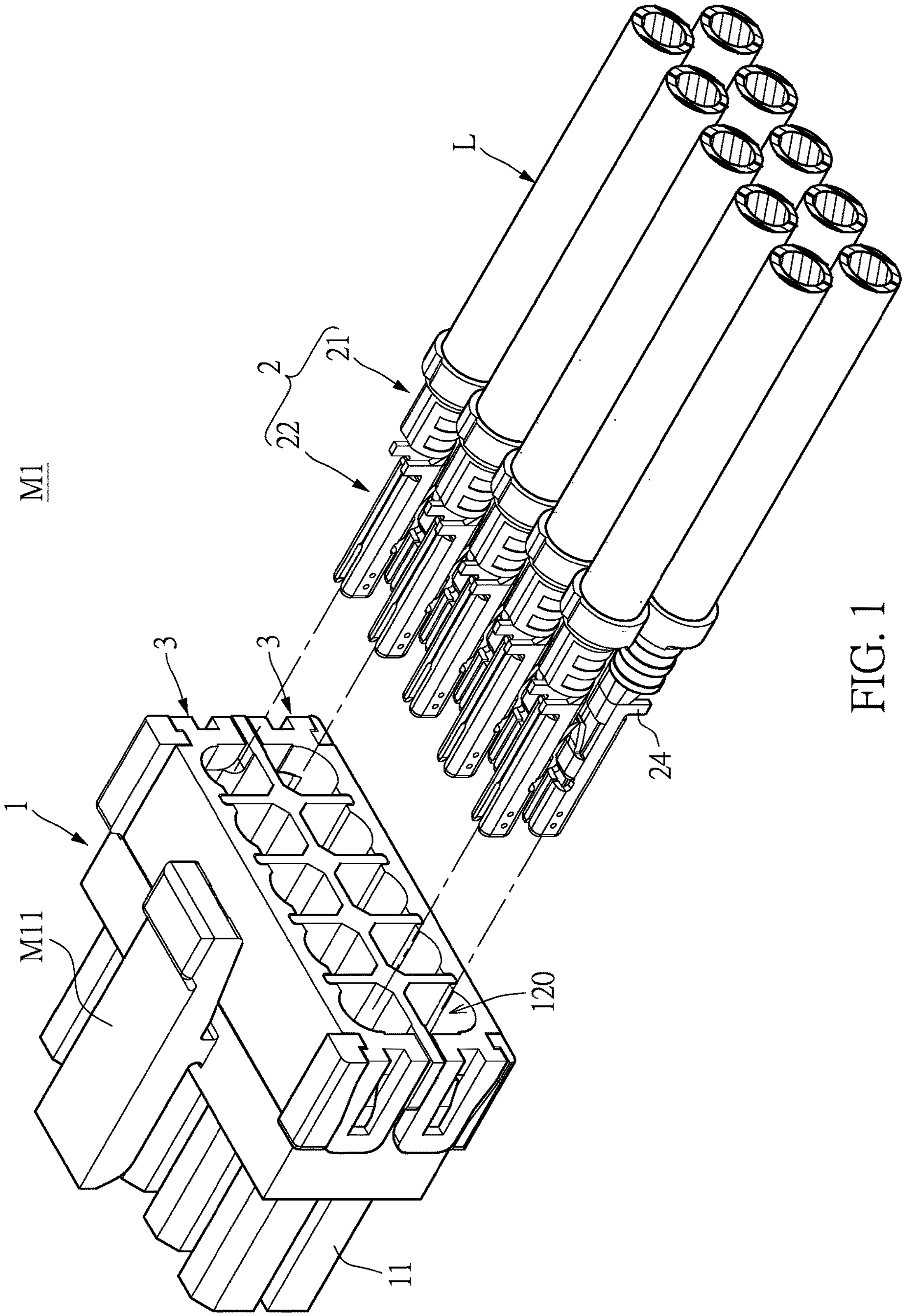
FIG. 1 is a schematic exploded view of an electrical power connector according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, FIG. 1 is a schematic exploded view of an electrical power connector according to a first embodiment of the present disclosure. An electrical power connector M1 is provided in the present disclosure, and the electrical power connector M1 includes an insulating housing 1, a plurality of electrically conductive terminals 2, and at least one position fixing member 3. Each of the electrically conductive terminals 2 has a cable clamping section 21 and a mating section 22. The cable clamping section 21 is used to clamp a cable L for transmitting electric current through the cable L.

Figure 2:
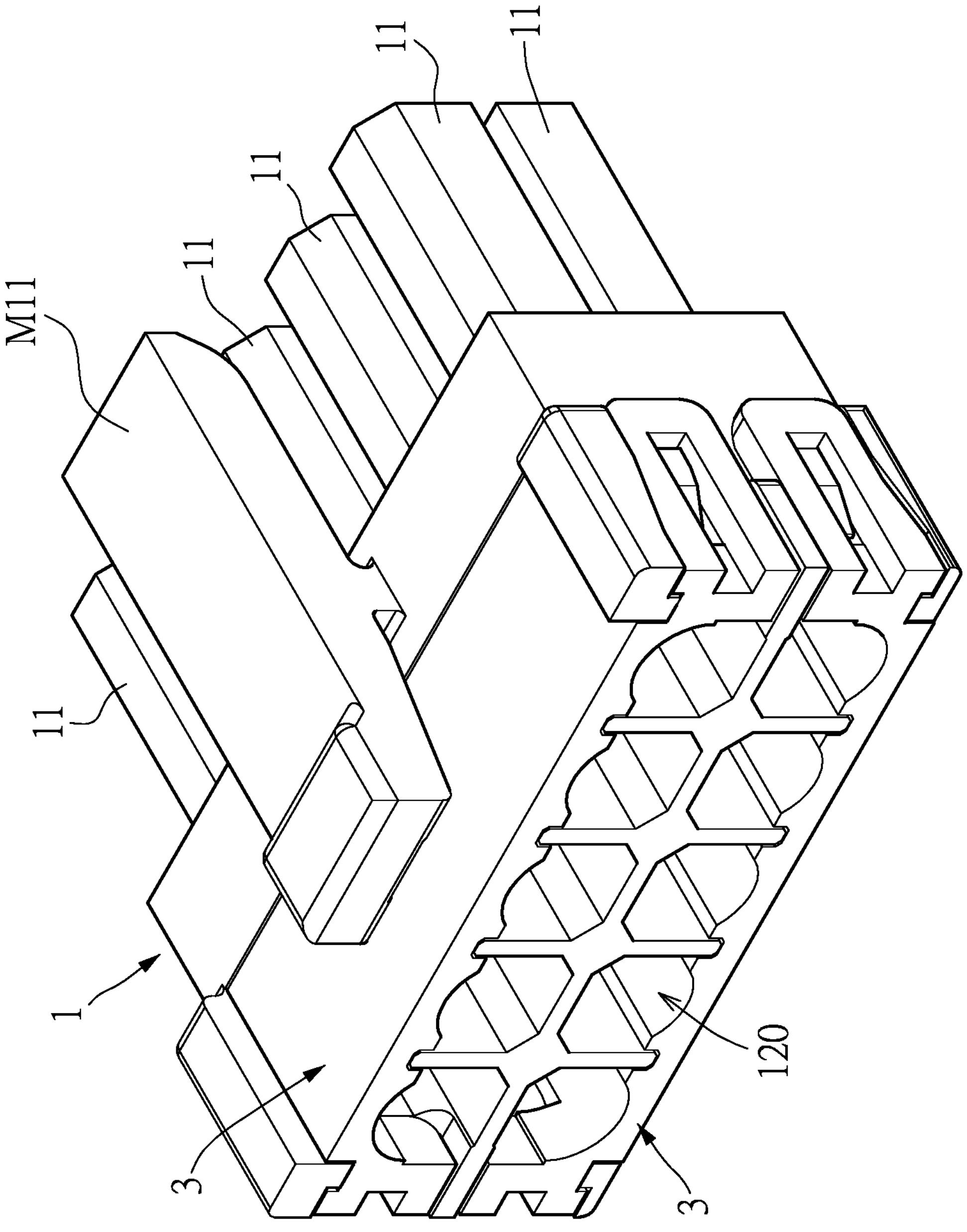
FIG. 2 is a schematic perspective view of an insulating housing and a position fixing member of the electrical power connector according to the first embodiment of the present disclosure.
Figure 3:
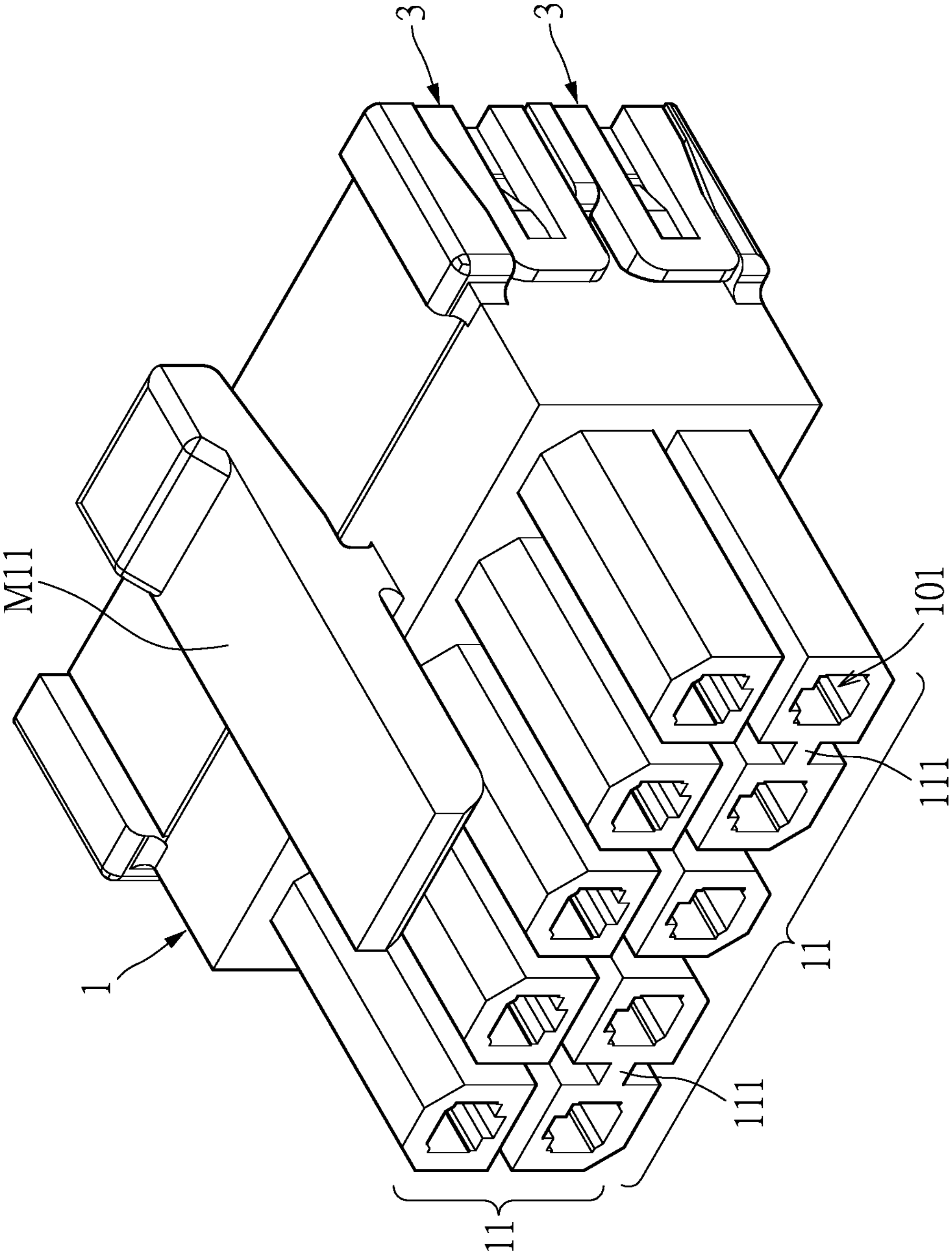
FIG. 3 is another schematic perspective view of the insulating housing and the position fixing member of the electrical power connector according to the first embodiment of the present disclosure.
Figure 4:
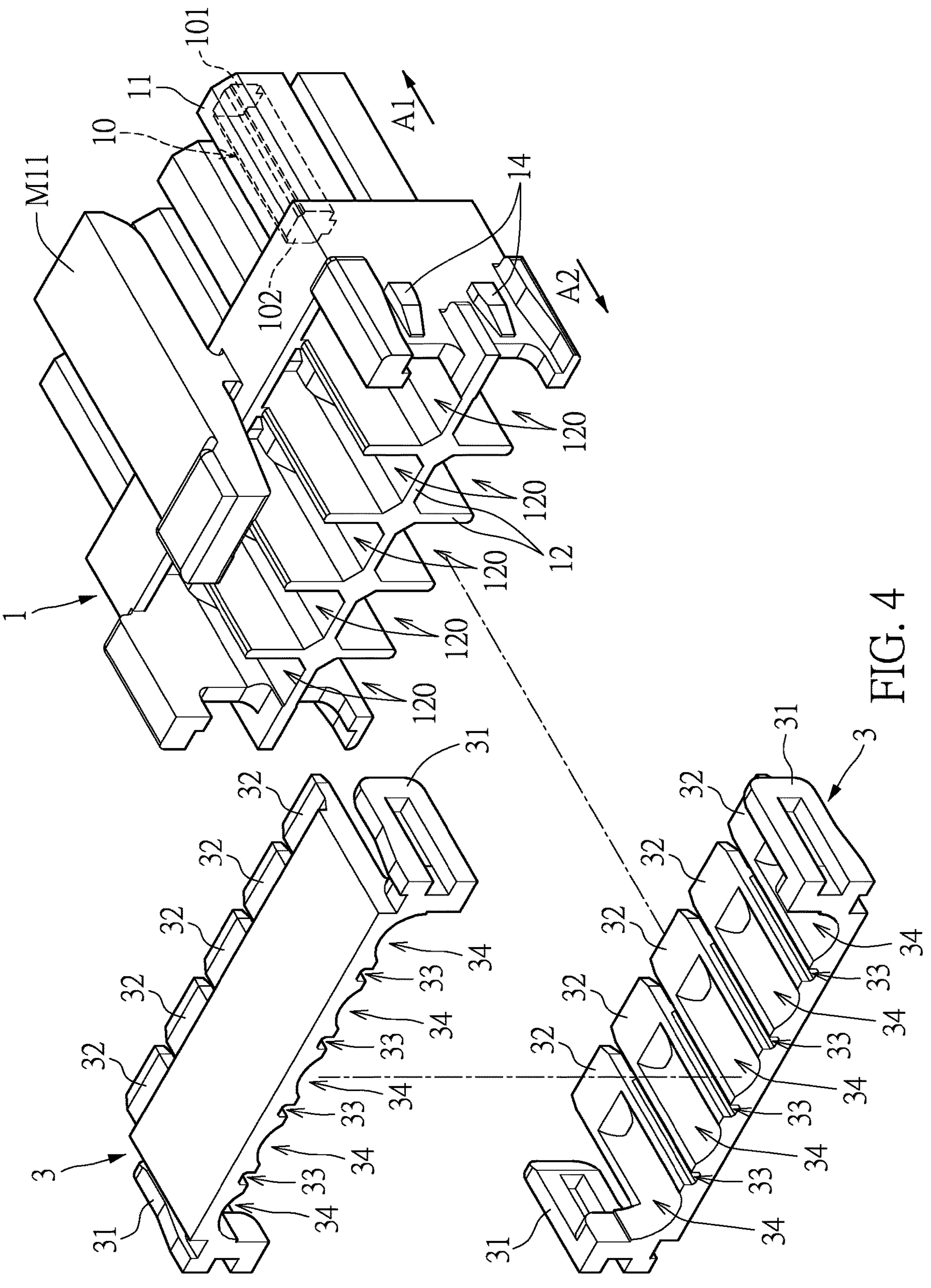
FIG. 4 is a schematic exploded view of the insulating housing and the position fixing member of the electrical power connector according to the first embodiment of the present disclosure.

Reference is made to FIG. 2 to FIG. 4, which are schematic views of an insulating housing and a position fixing member of the electrical power connector of the present disclosure. The insulating housing 1 includes a plurality of column bodies 11 and a convex rib structure 12. The at least one position fixing member 3 is embedded on at least one side of the convex rib structure 12 so as to be fixed on the insulating housing 1. Therefore, the at least one position fixing member 3 fixes the plurality of electrically conductive terminals 2 and the cable L in position. The plurality of column bodies 11 extend in a first direction A1 and are arranged at intervals (preferably at regular intervals).

The convex rib structure 12 is configured to extend in a second direction A2 and is formed in an intersecting arrangement. In this embodiment, the first direction A1 is opposite to the second direction A2. In practice, the first direction A1 can be perpendicular to the second direction A2. An inside of the insulating housing 1 has a plurality of tunnels 10, each of the tunnels 10 correspondingly penetrates through one of the plurality of column bodies 11 in the first direction A1, and one of a plurality of first terminal openings 101 and one of a plurality of second terminal openings 102 that corresponds to the one of the plurality of first terminal openings 101 are formed at two terminals of the one of the plurality of column bodies 11, respectively. Reference is further made to FIG. 4. Specifically, the convex rib structure 12 is arranged at peripheries of each of the second terminal openings 102. In addition, the convex rib structure 12 is formed by a plurality of longitudinal convex ribs being perpendicularly intersected by one transverse convex rib, so as to form a plurality of grid passages 120. The plurality of grid passages 120 correspond to the plurality of tunnels 10, respectively. In other words, each of the grid passages 120 is in spatial communication with the first terminal opening 101 and the second terminal opening 102 of a corresponding one of the plurality of tunnels 10.

A quantity of the position fixing member 3 in this embodiment is two, and the two position fixing members 3 are respectively embedded on two opposite sides (e.g., an upper side and a lower side in this embodiment) of the convex rib structure 12. Each of the position fixing members 3 includes at least one first engaging portion 31, a plurality of covers 32, and a plurality of retaining grooves 33. For example, when one of the position fixing members 3 is embedded on the upper side (or the lower side) of the convex rib structure 12, the at least one first engaging portion 31 of the position fixing member 3 is engaged to at least one second engaging portion 14 on a side wall of the insulating housing 1, and the plurality of retaining grooves 33 are respectively engaged to the plurality of longitudinal convex ribs of the convex rib structure 12. In this way, the plurality of covers 32 are respectively stacked upon the plurality of grid passages 120. Furthermore, the position fixing member 3 can also include a plurality of cable fixing grooves 34 respectively located at rear sides of the plurality of covers 32. The plurality of cable fixing grooves 34 are formed by the plurality of covers 32 extending rearward (i.e., extending in the second direction A2), and can be concave grooves.

As shown in FIG. 3, the plurality of column bodies 11 can be arranged into two parallel rows of the column bodies 11, at least one connecting portion 111 is formed between two adjacent ones of the plurality of column bodies 11, and the connecting portion 111 is located on a center of an interval between the two adjacent ones of the plurality of column bodies 11. However, in the present disclosure, there is no restriction as to where the connecting portion 111 is located in-between the two adjacent ones of the column bodies 11. That is, the connecting portion 111 does not need to be located at the center of the interval between the two adjacent ones of the column bodies 11, but can be located at an upper or a lower location of the interval (as long as the connecting portion 111 is located in the interval). For example, an upper row can be arranged to have five of the column bodies 11. A lower row can also be arranged to have five of the column bodies 11, and the five column bodies 11 are sequentially arranged as a first column body 11 to a fifth column body 11 from right to left or from left to right. The connecting portion 111 is formed between the first column body 11 and a second column body 11, and between a fourth column body 11 and the fifth column body 11. The connecting portion 111 is a foolproof structure, and the function of which will be illustrated in the following description.

Figure 5:
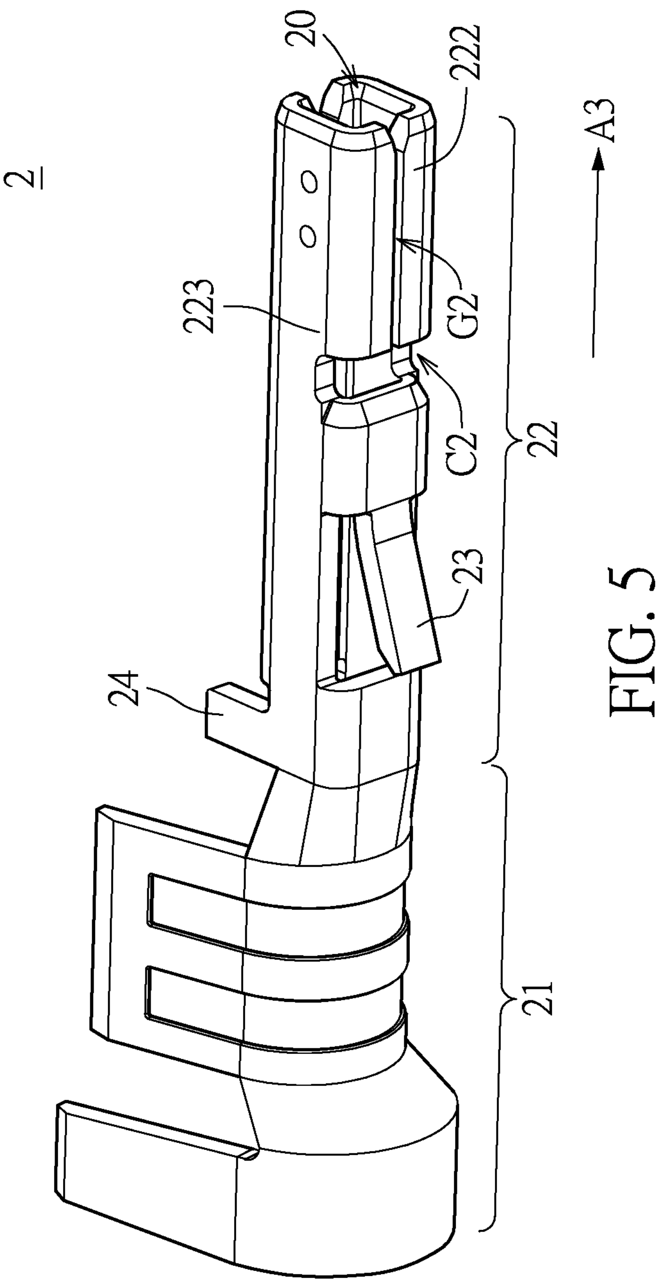
FIG. 5 is a schematic perspective view of an electrically conductive terminal of the electrical power connector according to the first embodiment of the present disclosure.
Figure 6:
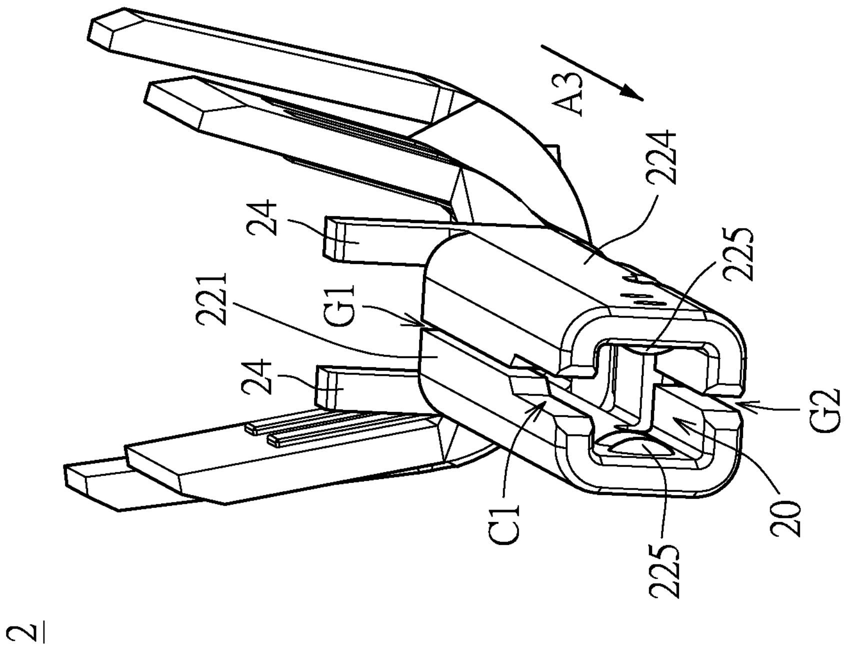
FIG. 6 is another schematic perspective view of the electrically conductive terminal of the electrical power connector according to the first embodiment of the present disclosure.

Reference is further made to FIG. 1, which is to be read in conjunction with FIG. 5 and FIG. 6. FIG. 5 and FIG. 6 are schematic perspective views of the electrically conductive terminal of the electrical power connector of the present disclosure. The plurality of electrically conductive terminals 2 are respectively mated in the plurality of grid passages 120 and the plurality of tunnels 10. The mating section 22 is formed by one side of the cable clamping section 21 extending in a third direction A3. An opening 20 is formed at one side of the mating section 22, and the one side of the mating section 22 is opposite to another side of the mating section 22 that is connected to the cable clamping section 21. An inner surface of the mating section 22 at the opening 20 has an inclined surface, so that a thickness of the mating section 22 at the opening 20 is smaller than that of the remaining part of the mating section 22. The mating section 22 includes a first side wall 221 and a second side wall 222 that are opposite to each other, and a third side wall 223 and a fourth side wall 224 that are opposite to each other and connected between the first side wall 221 and the second side wall 222. A first gap G1 is formed in the first side wall 221 in the third direction A3, a first notch C1 is formed at a position between the first gap G1 in the first side wall 221 and the opening 20, and the first notch C1 is extended in the same direction as the first gap G1. A width of the first notch C1 is greater than a width of the first gap G1. Preferably, the width of the first notch C1 is 0.26 mm.

Accordingly, each of the electrically conductive terminals 2 further has a wing structure 23 that extends outward from the second side wall 222 of the mating section 22, a second notch C2 can also be additionally formed on the second side wall 222, and the second notch C2 is preferably located at a position between the wing structure 23 and the opening 20. It should be noted that, the first notch C1 extends longitudinally and the second notch C2 extends transversely, and an extension direction of the second notch C2 is perpendicular to the extension direction of the first notch C1. A second gap G2 is formed at a position between the second notch C2 on the second side wall 222 and the opening 20 in the third direction A3. It is worth mentioning that, the width of the first notch C1 is greater than a width of the second gap G2, and the width of the first gap G1 is approximately equal to the width of the second gap G2. In addition, each of the electrically conductive terminals 2 has a stopping structure 24 disposed between the cable clamping section 21 and the mating section 22, and an extension direction of the stopping structure 24 is perpendicular to the extension direction of the mating section 22. For example, as shown in FIG. 5 and FIG. 6, the extension direction of the mating section 22 is the third direction A3, and the extension direction of the stopping structure 24 is perpendicular to the third direction A3. Furthermore, for each of the electrically conductive terminals 2, inner surfaces of the third side wall 223 and the fourth side wall 224 of the mating section 22 each have at least one protruding portion 225 formed thereon. That is, the at least one protruding portion 225, the first gap G1, and the second gap G2 are located in different side walls of the mating section 22. In addition, a plurality of thin films can be coated on a surface and a periphery of the at least one protruding portion 225. Preferably, an outermost layer of the plurality of thin films (i.e., an outermost layer of a surface) is a metallic thin layer, and a material of the metallic thin layer includes gold or tin.

It should be noted that, in the present disclosure, any part of each of the electrically conductive terminals 2 has an average thickness of at least 0.25 mm, or the average thickness can be at least one fifth of a width of each of the electrically conductive terminals 2. More specifically, a cross-sectional surface (not shown in the figures) can be defined on the mating section 22 of each of the electrically conductive terminals 2, and the cross-sectional surface is perpendicular to the third direction A3. Any segment of the mating section 22 of each of the electrically conductive terminals 2 has an average thickness of at least 0.25 mm or at least one fifth of a width of the cross-sectional surface on the cross-sectional surface. Furthermore, each of the electrically conductive terminals 2 is formed by a metal sheet (not shown in the figures) undergoing a stamping process and a bending process. Before the bending process, the metal sheet that has undergone the stamping process is first formed into one flat-shaped electrically conductive terminal 2 (at this time, the flat-shaped electrically conductive terminal 2 includes the cable clamping section 21 and the mating section 22 that have not yet undergone the bending process). Moreover, a thickness of the metal sheet is greater than or equal to 0.25 mm, or is greater than or equal to one-fifteenth of a width of the mating section 22 that has undergone the stamping process but has not yet undergone the bending process. In the present disclosure, by increasing the thickness of the metal sheet, a maximum amount of electrical current carried by the electrically conductive terminals 2 can be increased.

Figure 7:
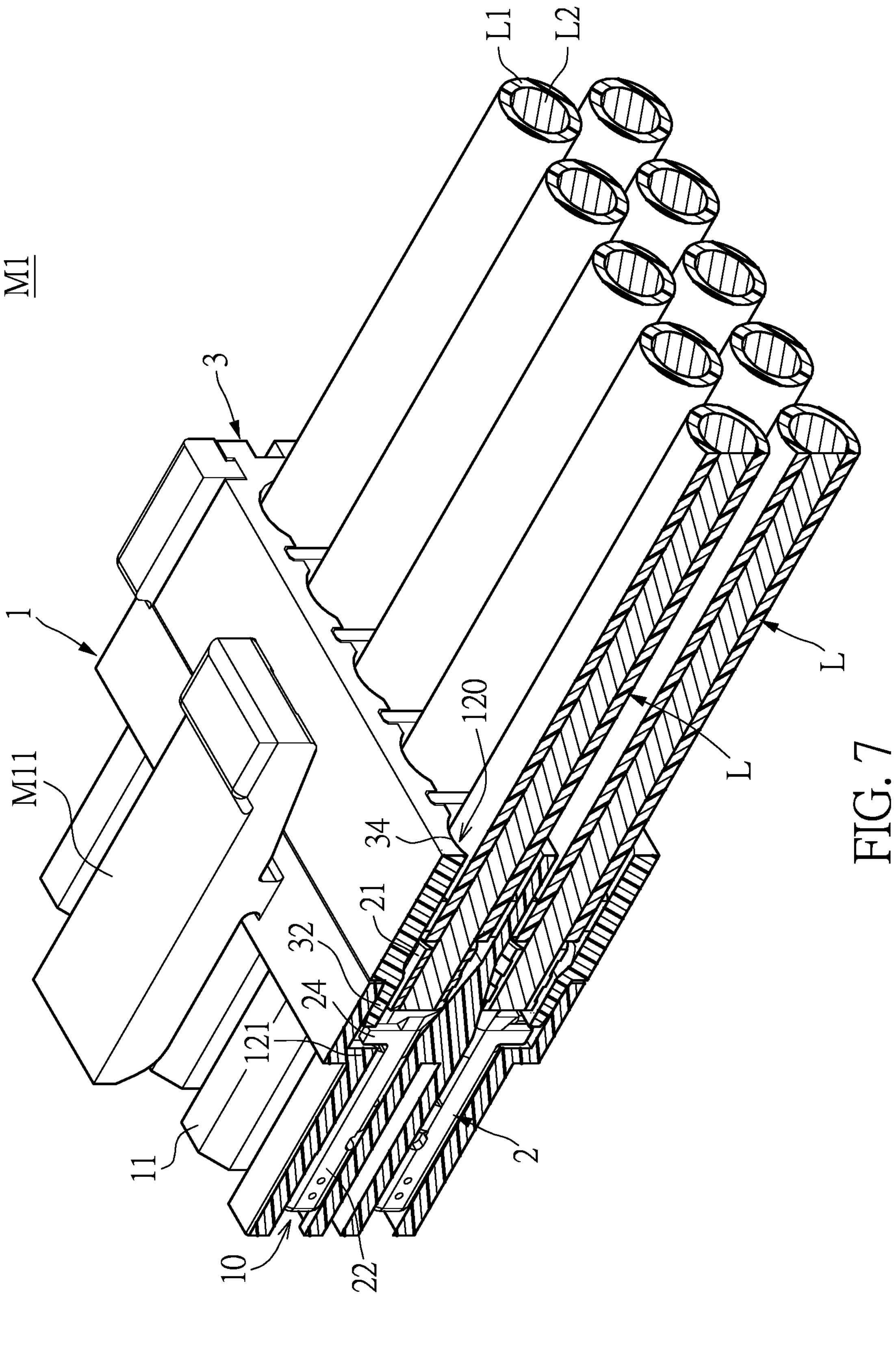
FIG. 7 is a schematic cross-sectional view of the electrical power connector according to the first embodiment of the present disclosure.

Reference is made to FIG. 7, which is a schematic cross-sectional view of the electrical power connector of the present disclosure. FIG. 7 mainly shows a relationship between the insulating housing 1, the electrically conductive terminals 2, and the position fixing members 3 of the electrical power connector M1. In an assembly process of the electrical power connector M1, the electrically conductive terminals 2 connected to the cables L are mated in the insulating housing 1 through the mating sections 22. Then, the two position fixing members 3 are respectively disposed at an upper side and a lower side of the grid passages 120 of the insulating housing 1. Referring also to FIG. 4, each of the position fixing members 3 is engaged to the second engaging portion 14 of the insulating housing 1 through the first engaging portion 31, so as to be fixed to the insulating housing 1. The plurality of retaining grooves 33 of each of the position fixing members 3 are respectively engaged to the plurality of longitudinal convex ribs, such that each of the plurality of covers 32 is stacked upon the corresponding one of the grid passages 120. Further, the plurality of covers 32 extend into a rear side of the insulating housing 1. The rear side of the insulating housing 1 is a side of the insulating housing 1 that is away from the plurality of column bodies 11.

Furthermore, when each of the electrically conductive terminals 2 connected to the cables L is mated to the insulating housing 1, the stopping structure 24 of one of the electrically conductive terminals 2 abuts against a ladder-shaped structure 121 (located on a rear side of the second terminal opening 102 of the corresponding tunnel 10) inside the insulating housing 1, and one of the covers 32 and the ladder-shaped structure 121 jointly sandwich the stopping structure 24 therebetween, so as to fix a position of the one of the electrically conductive terminals 2 in the insulating housing 1. From another perspective, when each of the electrically conductive terminals 2 connected to the cables L is mated to the insulating housing 1, the cable clamping section 21 of each of the electrically conductive terminals 2 is located in a corresponding one of the grid passages 120, and the mating section 22 of the electrically conductive terminal 2 is located in the corresponding tunnel 10 (referring to FIG. 1 and FIG. 7). In addition, the wing structure 23 of each of the electrically conductive terminals 2 located in the mating section 22 abuts against a groove (not shown in the figures) of the corresponding tunnel 10 inside the insulating housing 1. Moreover, the plurality of covers 32 respectively press against the cable clamping sections 21 of the electrically conductive terminals 2, so as to strengthen stability of the electrically conductive terminals 2. Furthermore, the plurality of column bodies 11 in the present disclosure are arranged into two parallel rows of the column bodies 11, one of the at least one position fixing member 3 is used to fix the electrically conductive terminals 2 that are mated in the column bodies 11 of one of the two parallel rows in position, and another one of the at least one position fixing member 3 is used to fix the electrically conductive terminals 2 that are mated in the column bodies 11 of another one of the two parallel rows in position. In the present disclosure, the position fixing member 3 can enhance a connection strength of the insulation housing 1, the electrically conductive terminal 2, and the cable L, and can strengthen a structural strength of the electrical power connector M1.

It should be noted that an insulating outer layer L1 of one end of each of the cables L is stripped off for a certain length, so as to expose a metallic wire L2 within. The metallic wire L2 may be a solid wire or a stranded wire, but is not limited thereto. The exposed metallic wire L2 is crimped by the cable clamping section 21 of the electrically conductive terminal 2, and a portion at a rear end of the cable L where the insulation outer layer L1 is not stripped is located in the cable fixing groove 34. In other words, the cable fixing groove 34 is located at the outside of the one end of the cable L, so as to limit a movement of the one end of the cable L or press against the cable L. In this way, a movement range of the cable L in the electrical power connector M1 is limited, even to the extent that the cable L is prevented from having any movement. Therefore, the electrically conductive terminal 2 is prevented from falling off from the electrical power connector M1 due to excessive swaying of the cable L.

Figure 8:
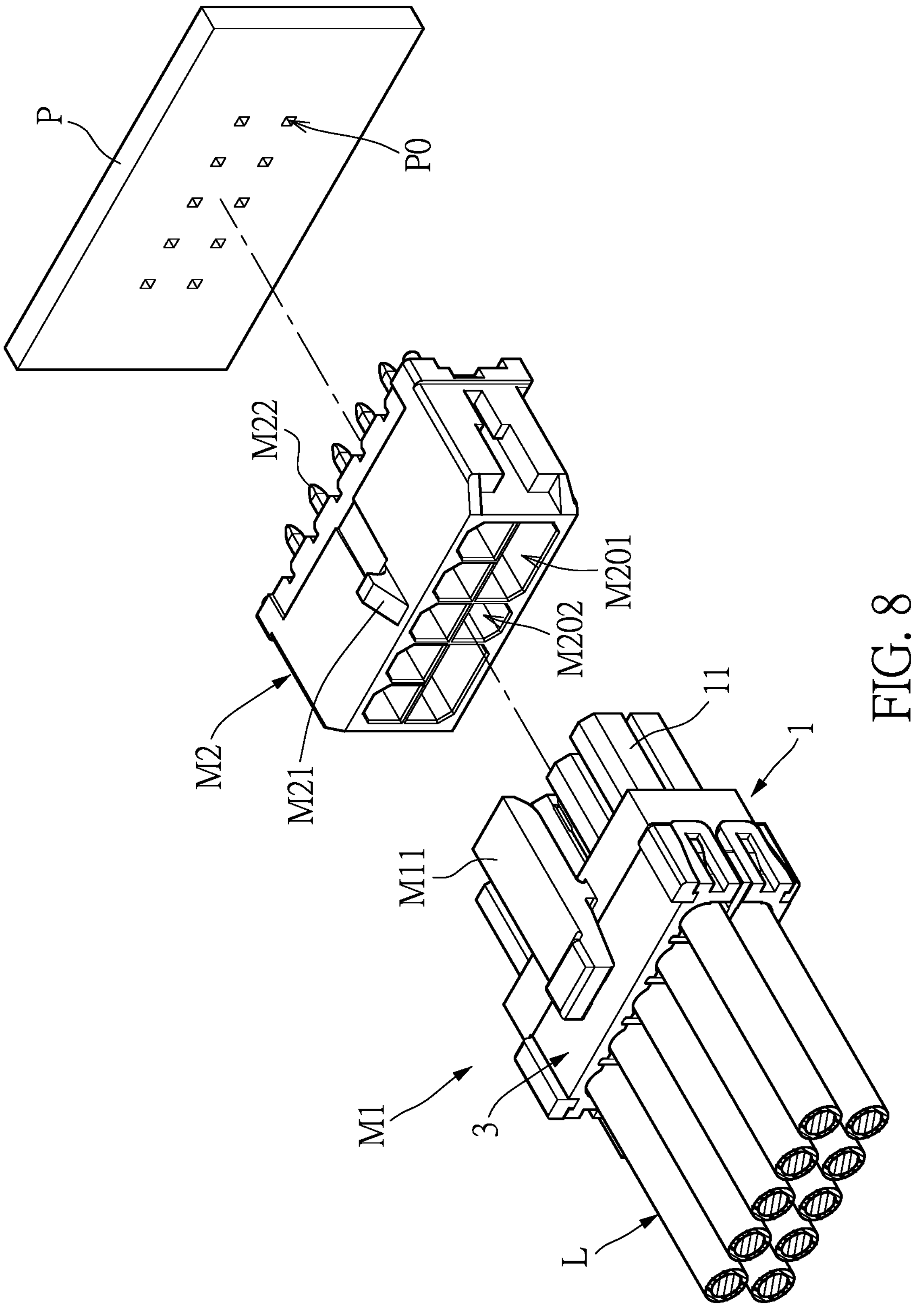
FIG. 8 is a schematic exploded view of the electrical power connector, a socket connector, and a circuit board according to the first embodiment of the present disclosure.
Figure 9:
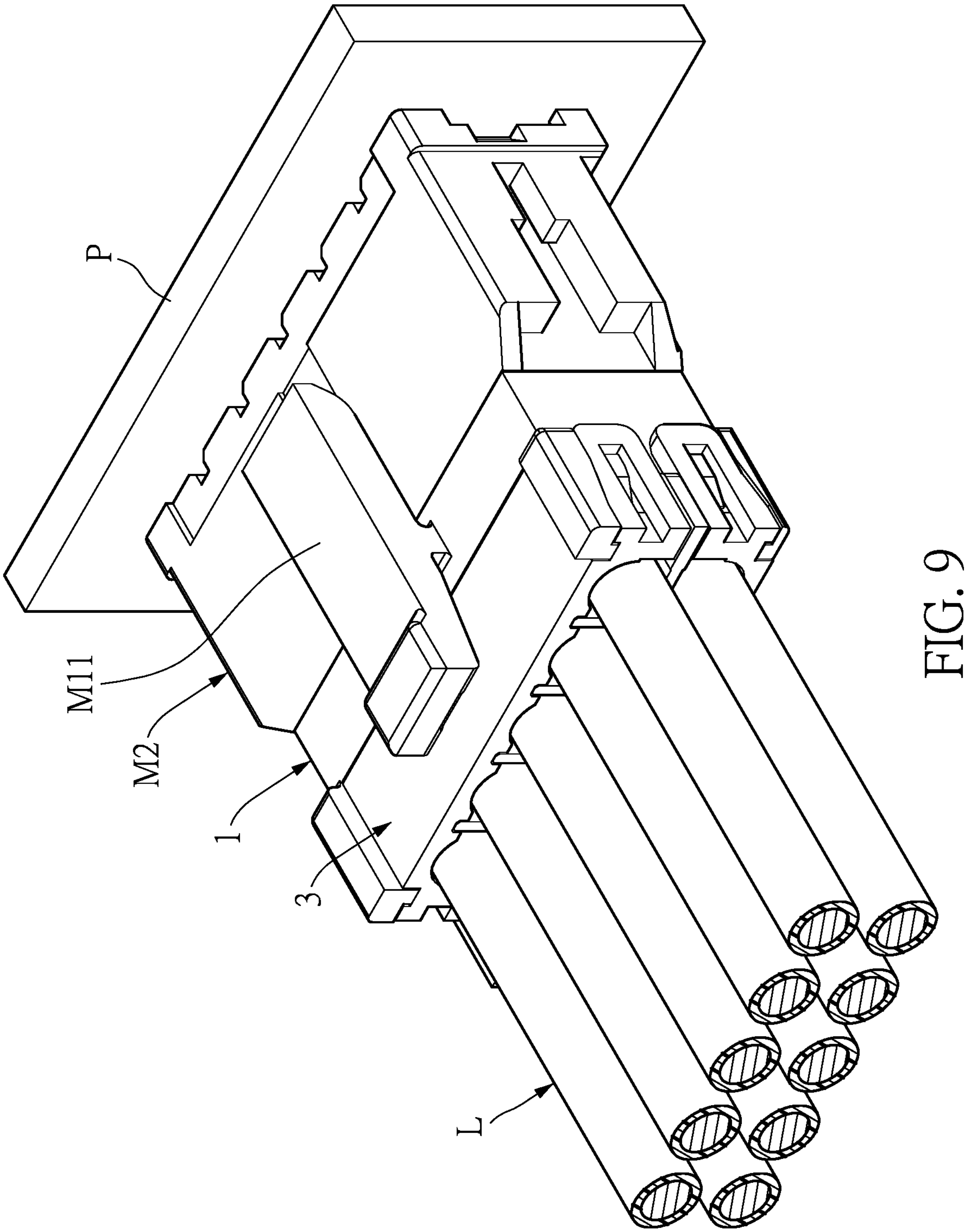
FIG. 9 is a schematic assembled view of the electrical power connector, the socket connector, and the circuit board according to the first embodiment of the present disclosure.

References are made to FIG. 8 and FIG. 9, which are schematic views of an electrical power connector, a socket connector, and a circuit board of the present disclosure. The electrical power connector M1 provided in the present disclosure is essentially a plug (male) connector that can be further mated into a socket (female) connector M2. The mating section 22 of the electrically conductive terminal 2 is located in the tunnel 10, and the opening 20 of the mating section 22 corresponds to the first terminal opening 101, i.e., the opening 20 is in spatial communication with the first terminal opening 101. When the electrical power connector M1 is mated into the socket connector M2, the plurality of column bodies 11 of the electrical power connector M1 are respectively mated into a plurality of sockets on the socket connector M2, and a third engaging portion M11 of the electrical power connector M1 engages to a fourth engaging portion M21 of the socket connector M2. The plurality of sockets on the socket connector M2 can be divided into first sockets M201 and second sockets M202. For example, referring to FIG. 3 and FIG. 8, the plurality of sockets can be divided into upper and lower rows, so as to correspond to the column bodies 11 of the electrical power connector M1 that are arranged into the upper and lower rows. The sockets of the upper row are configured to include only the second sockets M202, and the sockets of the lower row are configured to have one of the second sockets M202 arranged between two of the first sockets M201. Referring to FIG. 3, the connecting portion 111 is formed between two adjacent ones of the column bodies 11 of the lower row. When the electrical power connector M1 is mated into the socket connector M2, the column bodies 11 of the upper row can only be mated to the sockets of the upper row, and the column bodies 11 of the lower row can only be mated to the sockets of the lower row (if the electrical power connector M1 is reversely mated to the socket connector M2, the column bodies 11 of the lower row will be mated to the sockets of the upper row, and the connecting portions 111 will be blocked by side walls between the sockets of the upper row such that the mating is failed). In other words, the electrical power connector M1 can only be mated to the socket connector M2 in a fixed mating direction.

In continuation of the above, each of the first sockets M201 of the socket connector M2 has a plurality of mating pillars, and each of the second sockets M202 has one of the mating pillars (not shown in the figures). When the plurality of column bodies 11 of the electrical power connector M1 are respectively mated to the plurality of sockets of the socket connector M2, each of the mating pillars is mated to the corresponding mating section 22 of the electrically conductive terminal 2 inside the electrical power connector M1 through the corresponding first terminal opening 101 and the corresponding opening 20, so that the electrical power connector M1 is electrically connected to the socket connector M2. Furthermore, for each of the electrically conductive terminals 2, the inner surfaces of the third side wall 223 and the fourth side wall 224 of the mating section 22 each have the at least one protruding portion 225 formed thereon. Accordingly, when one of the mating pillars is mated to the mating section 22 of the electrically conductive terminal 2, the one of the mating pillars is in physical contact with the at least one protruding portion 225, such that the electrically conductive terminal 2 is electrically connected to the one of the mating pillars. Further, in the present disclosure, the average thickness of any part of the electrically conductive terminal 2 is increased for increasing the amount of electrical current that can be carried by the electrically conductive terminal 2. However, such a design increases a positive force applied to the mating pillar by the mating section 22, making it more difficult for a user to plug and unplug the electrical power connector M1 and the socket connector M2 (the user needs to exert more force to plug and unplug the electrical power connector M1 and the socket connector M2). Therefore, in the present disclosure, the first notch C1 is configured at the opening 20 of the mating section 22 of the electrically conductive terminal 2 to increase the flexibility of the opening 20, so as to reduce the positive force applied to the mating pillar by the mating section 22, reduce the difficulty of plugging and unplugging the electrical power connector M1 and the socket connector M2, and prevent the metal pieces in the opening 20 of the electrically conductive terminal 2 from colliding with each other when the electrically conductive terminal 2 is formed during the bending process. In addition, since the mating pillar is in physical contact with the protruding portion 225 of the mating section 22, and the outermost layer of the protruding portion 225 is coated with a thin metal layer, a friction coefficient of the thin metal layer (that is made from gold or tin) is small. Therefore, a frictional force between the mating pillar and the protruding portion 225 is reduced. At the same time, a contact impedance is reduced, and contact between dissimilar metals is avoided. Thus, effects of reducing the positive force applied to the mating pillar by the mating section 22, reducing the difficulty of plugging and unplugging the electrical power connector M1 and the socket connector M2, reducing the contact impedance, and avoiding galvanic corrosion between the dissimilar metals can be further achieved.

Figure 10:
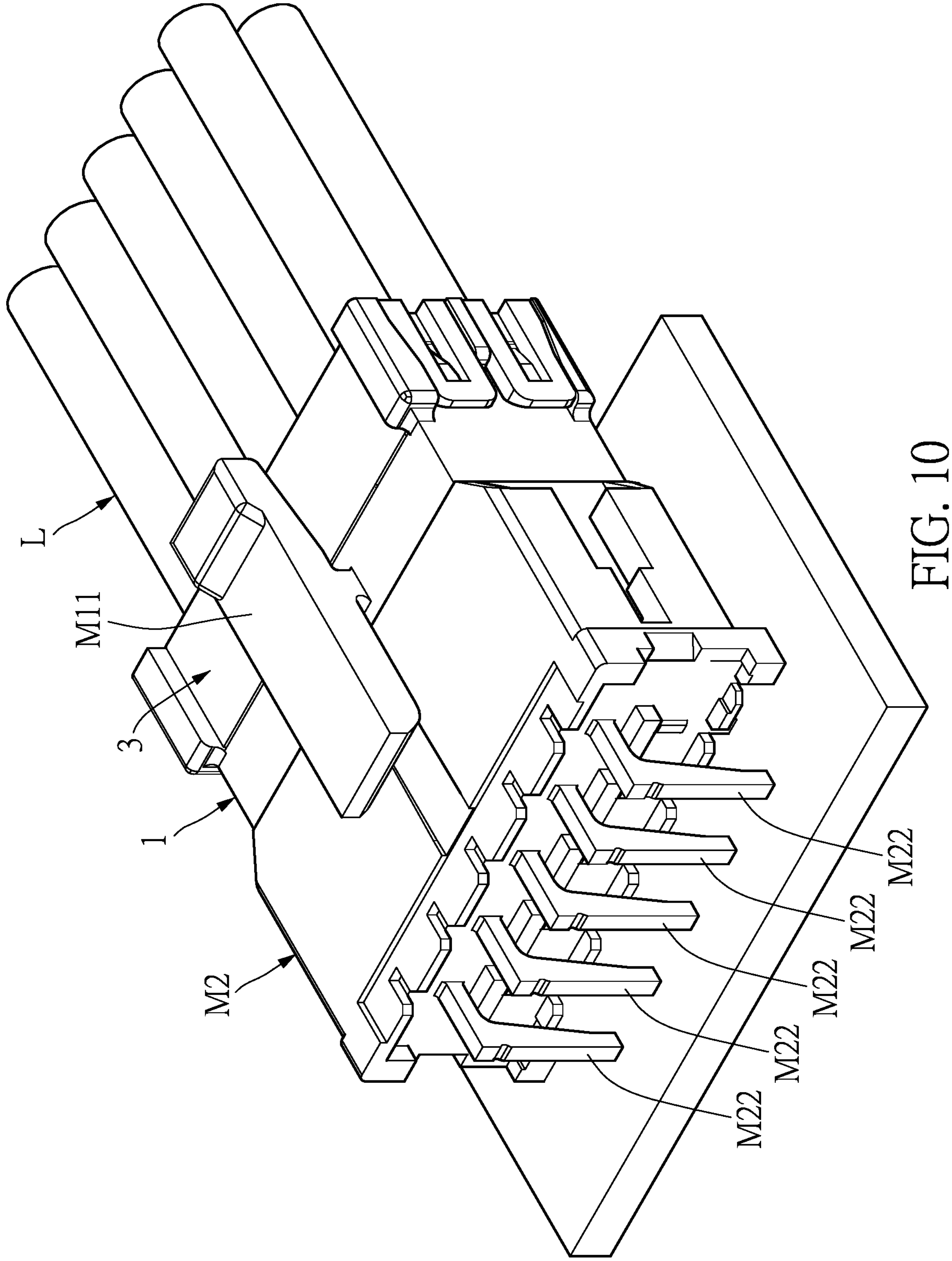
FIG. 10 is another schematic assembled view of the electrical power connector, the socket connector, and the circuit board according to the first embodiment of the present disclosure.

Referring further to FIG. 8 and FIG. 9, ends of the mating pillars in the plurality of sockets of the socket connector M2 extend out from one side of the socket connector M2 to form a plurality of pins M22. That is, the plurality of pins M22 and the plurality of sockets (the first sockets M201 and the second sockets M202) are correspondingly arranged on two opposite sides of the socket connector M2. The socket connector M2 is fixed to a circuit board P through the plurality of pins M22 being mounted in a plurality of pinholes P0 of the circuit board P. However, it should be noted that types of connection between the socket connector M2 and the circuit board P are not limited in the present disclosure. For example, in this embodiment, the plurality of pins M22 of the socket connector M2 straightly extend out from the socket connector M2 and are mounted in the plurality of pinholes P0 of the circuit board P without bending. However, in another embodiment as shown in FIG. 10, the plurality of pins M22 of the socket connector M2 can also straightly extend out from the socket connector M2 and then bend downwardly to be mounted in the plurality of pinholes P0 of the circuit board P.

Second Embodiment

Figure 11:
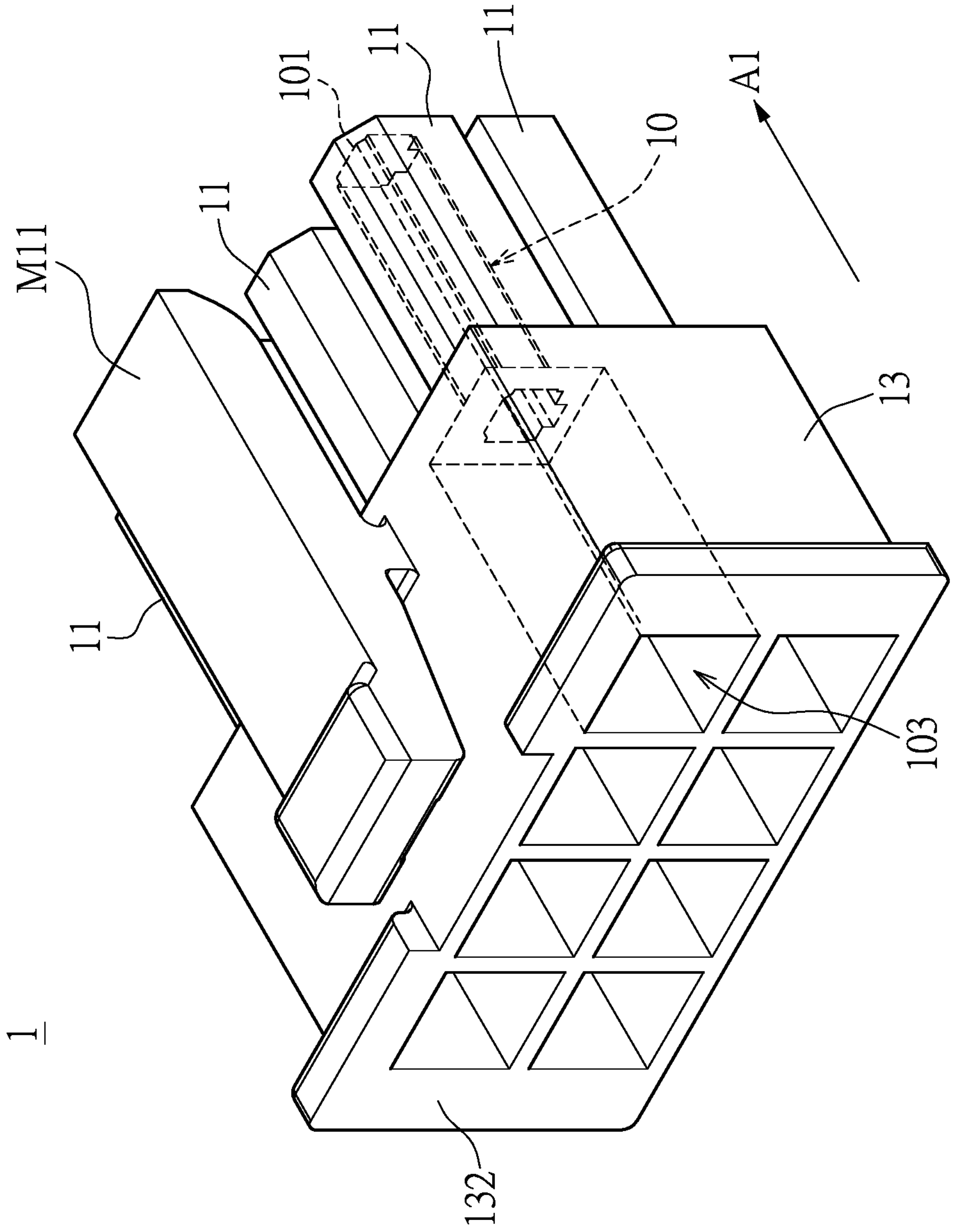
FIG. 11 is a schematic perspective view of the insulating housing of the electrical power connector according to a second embodiment of the present disclosure.
Figure 12:
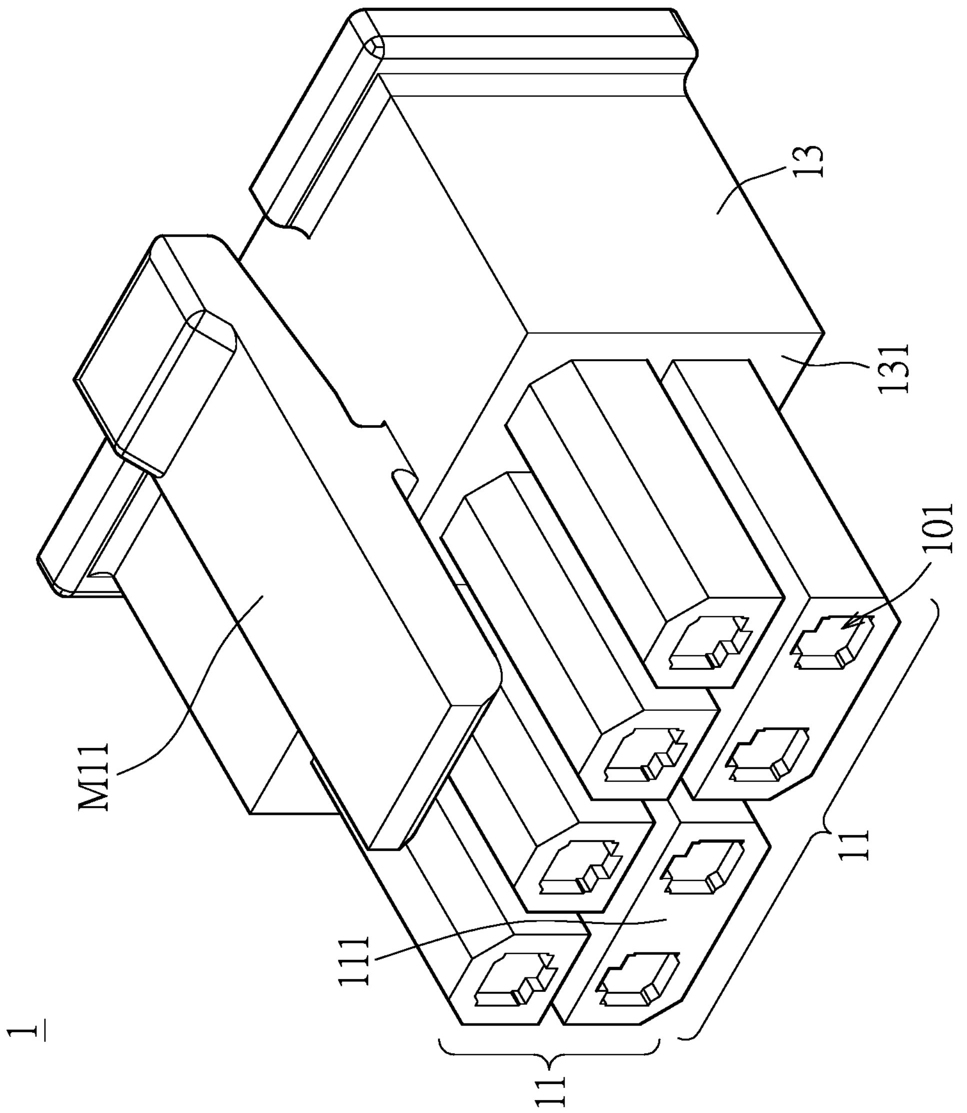
FIG. 12 is another schematic perspective view of the insulating housing of the electrical power connector according to the second embodiment of the present disclosure.

Reference is made to FIG. 11 and FIG. 12, which are schematic perspective views of the insulating housing of the electrical power connector according to a second embodiment of the present disclosure. It should be noted that differences between the second and the first embodiments reside only in the structure of the insulating housing and the presence or absence of the position fixing member, and descriptions of other components of the second embodiment that are similar to those of the first embodiment are omitted herein. Referring to FIG. 11 and FIG. 12 (which are to be read in conjunction with FIG. 1), in the electrical power connector provided in the second embodiment of the present disclosure, the insulating housing 1 as shown in FIG. 1 is replaced with the insulating housing 1 of this embodiment.

Specifically, the electrical power connector of the second embodiment of the present disclosure does not require a position fixing member. Therefore, a convex rib structure is also not required in the structural design of the insulating housing. The insulating housing 1 of the second embodiment of the present disclosure includes a main body 13 and a plurality of column bodies 11 disposed on the main body 13, the main body 13 has a first side surface 131 and a second side surface 132 that are opposite to each other, and one end of each of the plurality of column bodies 11 is arranged on the first side surface 131. The plurality of column bodies 11 extend in a first direction A1 and are arranged at intervals. An inside of the insulating housing 1 has a plurality of tunnels 10, and each of the tunnels 10 correspondingly penetrates through one of the plurality of column bodies 11 and the main body 13 in the first direction A1, each of the tunnels has one of a plurality of first terminal openings 101 formed at another end of one of the plurality of column bodies 11, and has one of a plurality of third terminal openings 103 that corresponds to the one of the plurality of first terminal openings 101 formed at the second side surface 132. A plurality of electrically conductive terminals 2 are respectively mated in the plurality of tunnels 10. Furthermore, in this embodiment, the connecting portion 111 formed between two adjacent ones of the column bodies 11 of the lower row fills the interval between the two adjacent ones of the column bodies 11.

Beneficial Effects of the Embodiments

In conclusion, by virtue of "the two position fixing members 3 being fixed on the housing 1 by being embedded on at least one side of the convex rib structure 12, such that the two position fixing members 3 fix the plurality of electrically conductive terminals 2 and the plurality of cables L in position" and "a width of the first notch C1 being greater than a width of the first gap G1", the electrical power connector M1 and the electrically conductive terminal 2 provided by the present disclosure can maintain a stable connection between the electrically conductive terminal 2 and the cable L in the electrical power connector.

Furthermore, the average thickness of any part of the electrically conductive terminal 2 is increased for increasing the amount of electrical current that can be carried by the electrically conductive terminal 2. However, such a design increases the positive force applied to the mating pillar by the mating section 22, making it more difficult for the user to plug and unplug the electrical power connector M1 and the socket connector M2 (the user needs to exert more force to plug and unplug the electrical power connector M1 and the socket connector M2). Therefore, in the present disclosure, the first notch C1 is configured at the opening 20 of the mating section 22 of the electrically conductive terminal 2 to increase the flexibility of the opening 20, thereby reducing the positive force applied to the mating pillar by the mating section 22. At the same time, the contact impedance is reduced, and the contact between the dissimilar metals is avoided. That is, the difficulty of plugging and unplugging the electrical power connector M1 and the socket connector M2 is reduced, the contact impedance of the electrical power connector M1 and the socket connector M2 is reduced, and the galvanic corrosion between the dissimilar metals in the electrical power connector M1 and the socket connector M2 is avoided. Furthermore, since the mating pillar is in physical contact with the protruding portion 225 of the mating section 22, and the protruding portion 225 is coated with a thin metal layer (made from gold or tin) that has high potential, the galvanic corrosion between the mating pillar and the electrically conductive terminal 2 is reduced, and the electrical power connector M1 and the socket connector M2 can each have an extended service life.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electrical power connector, comprising:

an insulating housing including a plurality of column bodies and a convex rib structure, wherein the plurality of column bodies extend in a first direction and are arranged at intervals, the convex rib structure is configured to extend in a second direction and is formed in an intersecting arrangement, and the first direction is opposite to or perpendicular to the second direction; wherein an inside of the insulating housing has a plurality of tunnels, each of the tunnels correspondingly penetrates through one of the plurality of column bodies in the first direction, and one of a plurality of first terminal openings and one of a plurality of second terminal openings that corresponds to the one of the plurality of first terminal openings are formed at two terminals of the one of the plurality of column bodies, respectively; wherein the convex rib structure is arranged at peripheries of the second terminal openings to form a plurality of grid passages, and the plurality of grid passages correspond to the plurality of tunnels, respectively;

a plurality of electrically conductive terminals respectively mated in the plurality of grid passages and the plurality of tunnels, wherein each of the electrically conductive terminals has a cable clamping section and a mating section, the cable clamping section is used to clamp one of a plurality of cables, and the mating section is formed by one side of the cable clamping section extending in a third direction; wherein an opening is formed at one side of the mating section, and the one side of the mating section is opposite to another side of the mating section that is connected to the cable clamping section; wherein the mating section includes a first side wall and a second side wall that are opposite to each other, and a third side wall and a fourth side wall that are opposite to each other and connected between the first side wall and the second side wall; wherein a first gap is formed in the first side wall in the third direction, a first notch is formed at a position between the first gap in the first side wall and the opening, and a width of the first notch is greater than a width of the first gap; and at least one position fixing member embedded on at least one side of the convex rib structure so as to be fixed on the insulating housing, such that the at least one position fixing member fixes the plurality of electrically conductive terminals and the plurality of cables in position.

2. The electrical power connector according to claim 1, wherein each of the electrically conductive terminals further has a wing structure that extends outward from the second side wall of the mating section, a second notch is formed on the second side wall, a second gap is formed at a position between the second notch on the second side wall and the opening in the third direction, and the width of the first notch is greater than a width of the second gap.

3. The electrical power connector according to claim 2, wherein inner surfaces of the third side wall and the fourth side wall each have at least one protruding portion formed thereon.

4. The electrical power connector according to claim 3, wherein a metallic thin layer is coated on an outermost layer of a surface of the at least one protruding portion, and a material of the metallic thin layer includes gold or tin.

5. The electrical power connector according to claim 1, wherein a cross-sectional surface is defined on the mating section of each of the electrically conductive terminals, the cross-sectional surface is perpendicular to the first direction, and any segment of the mating section of each of the electrically conductive terminals has an average thickness of at least 0.25 mm on the cross-sectional surface.

6. The electrical power connector according to claim 5, wherein inner surfaces of the third side wall and the fourth side wall each have at least one protruding portion formed thereon.

7. The electrical power connector according to claim 5, wherein a metallic thin layer is coated on an outermost layer of a surface of the at least one protruding portion, and a material of the metallic thin layer includes gold or tin.

8. The electrical power connector according to claim 1, wherein the plurality of column bodies are arranged into two parallel rows, a quantity of the at least one position fixing member is two, one of the at least one position fixing member is used to fix the electrically conductive terminals that are mated in the column bodies of one of the two parallel rows in position, and another one of the at least one position fixing member is used to fix the electrically conductive terminals that are mated in the column bodies of another one of the two parallel rows in position.

9. The electrical power connector according to claim 1, wherein each of the at least one position fixing member includes a first engaging portion, a plurality of covers, a plurality of retaining grooves, and a plurality of cable fixing grooves, and the insulating housing further includes a second engaging portion; wherein, when each of the at least one position fixing member is embedded on the convex rib structure, the first engaging portion is engaged to the second engaging portion, the plurality of retaining grooves are engaged to the convex rib structure, the plurality of covers respectively press against the cable clamping section of each of the electrically conductive terminals, and the plurality of cable fixing grooves respectively limit a movement of one terminal of each of the plurality of cables.

10. An electrical power connector, comprising:

an insulating housing including a main body and a plurality of column bodies, wherein the main body has a first side surface and a second side surface that are opposite to each other, and one end of each of the plurality of column bodies is arranged on the first side surface; wherein the plurality of column bodies extend in a first direction and are arranged at intervals; wherein an inside of the insulating housing has a plurality of tunnels, and each of the tunnels correspondingly penetrates through one of the plurality of column bodies and the main body in the first direction; wherein each of the tunnels has one of a plurality of first terminal openings formed at another end of one of the plurality of column bodies, and has one of a plurality of third terminal openings that corresponds to the one of the plurality of first terminal openings formed at the second side surface; and a plurality of electrically conductive terminals respectively mated in the plurality of tunnels, wherein each of the electrically conductive terminals has a cable clamping section and a mating section, the cable clamping section is used to clamp a cable, and the mating section is formed by one side of the cable clamping section extending in the first direction; wherein an opening is formed at one side of the mating section, and the one side of the mating section is opposite to another side of the mating section that is connected to the cable clamping section; wherein the mating section includes a first side wall and a second side wall that are opposite to each other, and a third side wall and a fourth side wall that are opposite to each other and connected between the first side wall and the second side wall; wherein a first gap is formed in the first side wall in the first direction, a first notch is formed at a position between the first gap in the first side wall and the opening, and a width of the first notch is greater than a width of the first gap.

11. The electrical power connector according to claim 10, wherein a wing structure extends outward from the second side wall, a second notch is formed at a position adjacent to the wing structure on the second side wall, a second gap is formed at a position between the second notch on the second side wall and the opening in the first direction, and the width of the first notch is greater than a width of the second gap.

12. The electrical power connector according to claim 11, wherein inner surfaces of the third side wall and the fourth side wall each have at least one protruding portion formed thereon.

13. The electrical power connector according to claim 12, wherein a metallic thin layer is coated on an outermost layer of the at least one protruding portion and a periphery thereof, and a material of the metallic thin layer includes gold or tin.

14. The electrical power connector according to claim 10, wherein a cross-sectional surface is defined on the mating section of each of the electrically conductive terminals, the cross-sectional surface is perpendicular to the first direction, and any segment of the mating section of each of the electrically conductive terminals has an average thickness of at least 0.25 mm on the cross-sectional surface.

15. The electrical power connector according to claim 14, wherein inner surfaces of the third side wall and the fourth side wall each have at least one protruding portion formed thereon.

16. The electrical power connector according to claim 15, wherein a metallic thin layer is coated on an outermost layer of the at least one protruding portion and a periphery thereof, and a material of the metallic thin layer includes gold or tin.

17. The electrical power connector according to claim 10, wherein the plurality of column bodies are arranged into two parallel rows, a connecting portion is formed between two adjacent ones of the column bodies in the first direction, and the connecting portion is located at a center of an interval between the two adjacent ones of the column bodies.

18. An electrically conductive terminal, comprising:

a cable clamping section; and a mating section formed by one side of the cable clamping section extending in a first direction, wherein an opening is formed at one side of the mating section, and the one side of the mating section is opposite to another side of the mating section that is connected to the cable clamping section; wherein the mating section includes a first side wall and a second side wall that are opposite to each other, and a third side wall and a fourth side wall that are opposite to each other and connected between the first side wall and the second side wall; wherein a first gap is formed in the first side wall in the first direction, a first notch is formed at a position between the first gap in the first side wall and the opening, the first notch is directly formed at an edge of the opening, and a width of the first notch is greater than a width of the first gap.

19. The electrically conductive terminal according to claim 18, wherein a cross-sectional surface is defined on the mating section, the cross-sectional surface is perpendicular to the first direction, and any segment of the mating section has an average thickness of at least 0.25 mm on the cross-sectional surface.

20. The electrically conductive terminal according to claim 18, wherein a cross-sectional surface is defined on the mating section, the cross-sectional surface is perpendicular to the first direction, and any segment of the mating section has an average thickness of at least one fifth of a width of the cross-sectional surface on the cross-sectional surface.

21. The electrically conductive terminal according to claim 18, wherein a wing structure extends outward from the second side wall, a second notch is formed at a position adjacent to the wing structure on the second side wall, a second gap is formed at a position between the second notch on the second side wall and the opening in the first direction, and the width of the first notch is greater than a width of the second gap.

22. The electrically conductive terminal according to claim 18, wherein inner surfaces of the third side wall and the fourth side wall each have at least one protruding portion formed thereon.

* * * * *